June 9, 1942.  W. F. GROENE ET AL  2,285,772
METHOD OF MACHINING CRANKSHAFTS
Filed Jan. 21, 1941  4 Sheets-Sheet 3
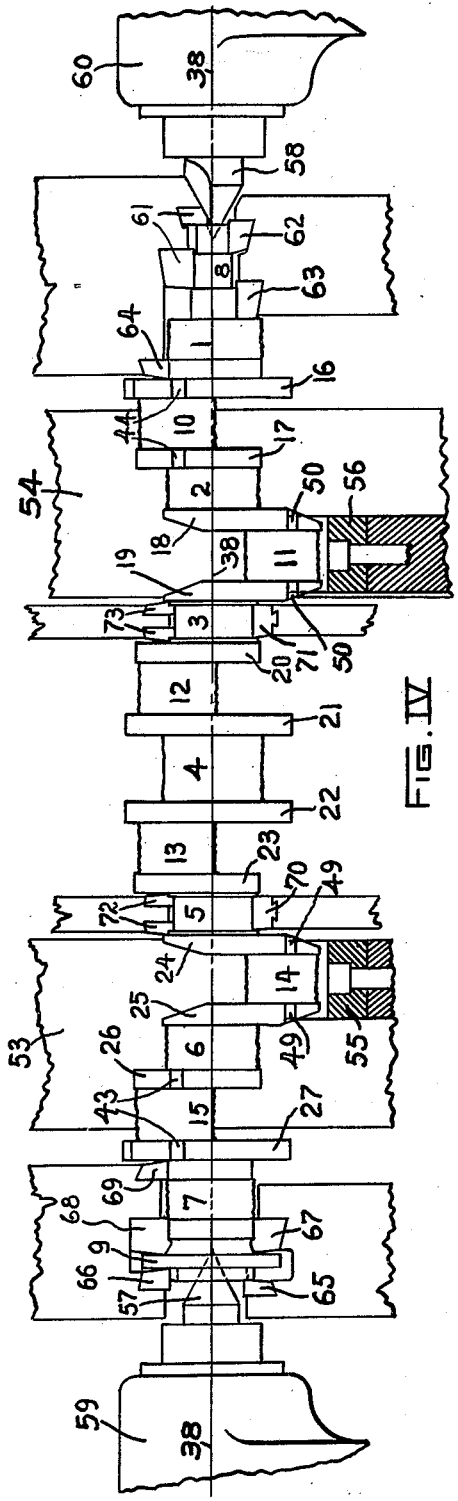
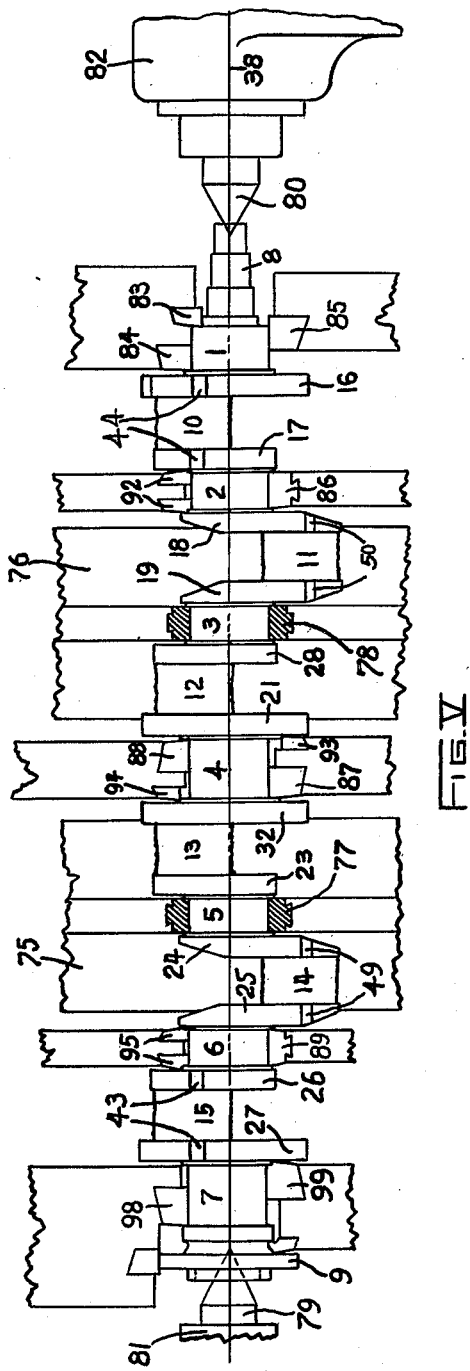
INVENTORS.
WILLIAM F. GROENE
HAROLD J. SIEKMANN
BY Willard G. Groene

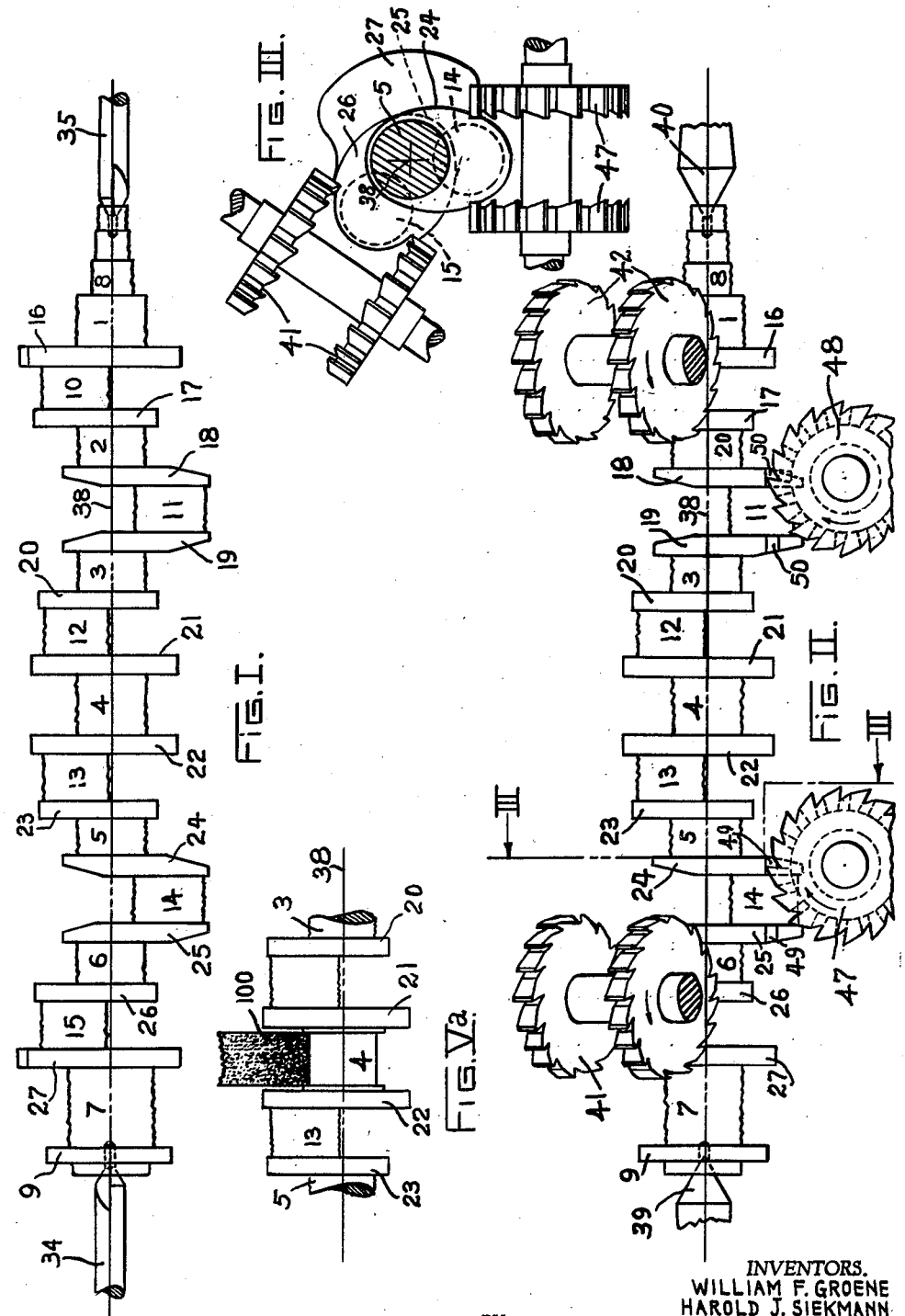

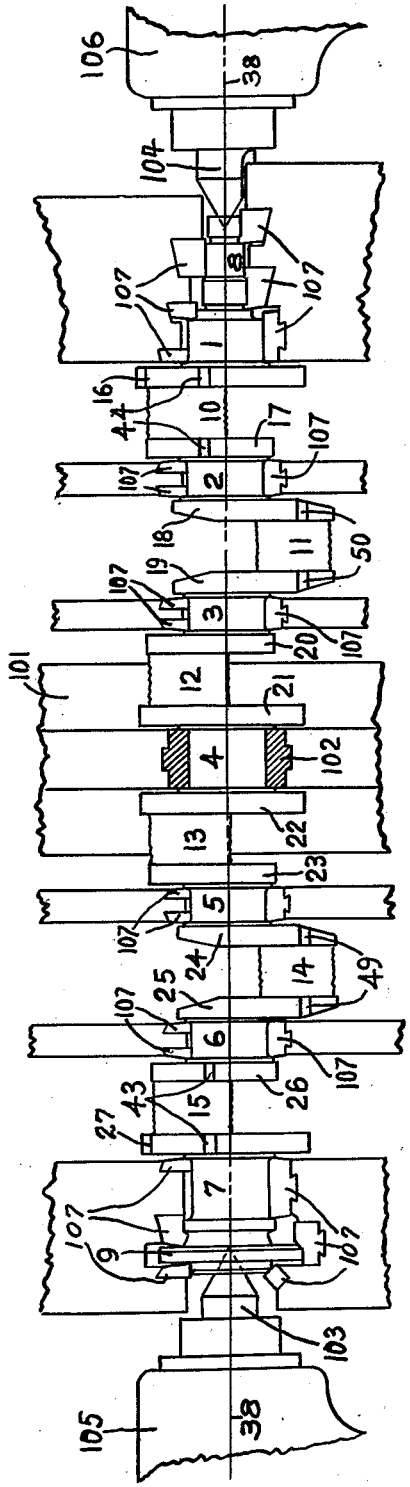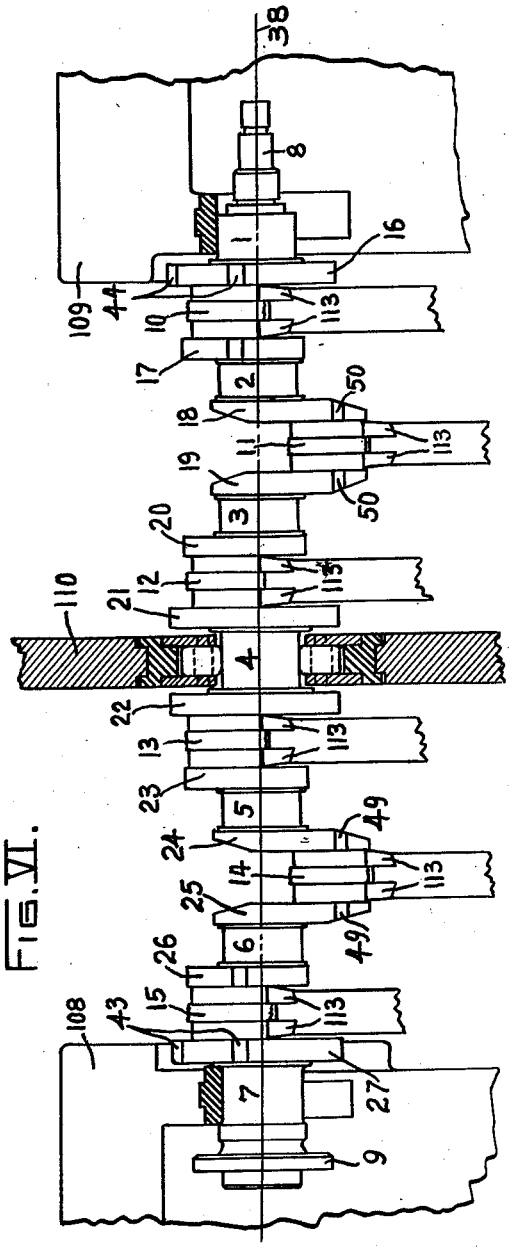

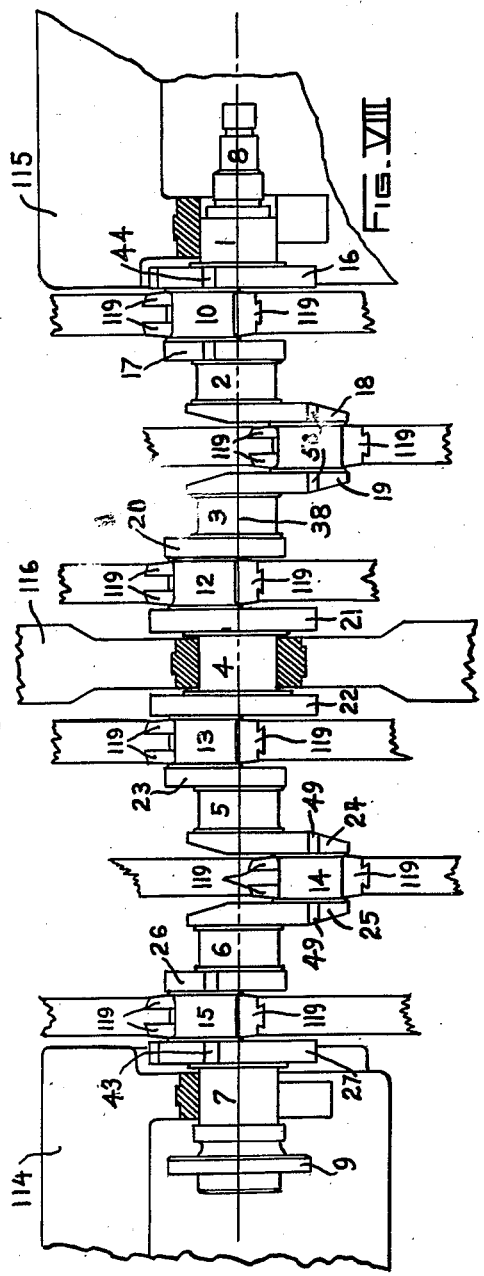
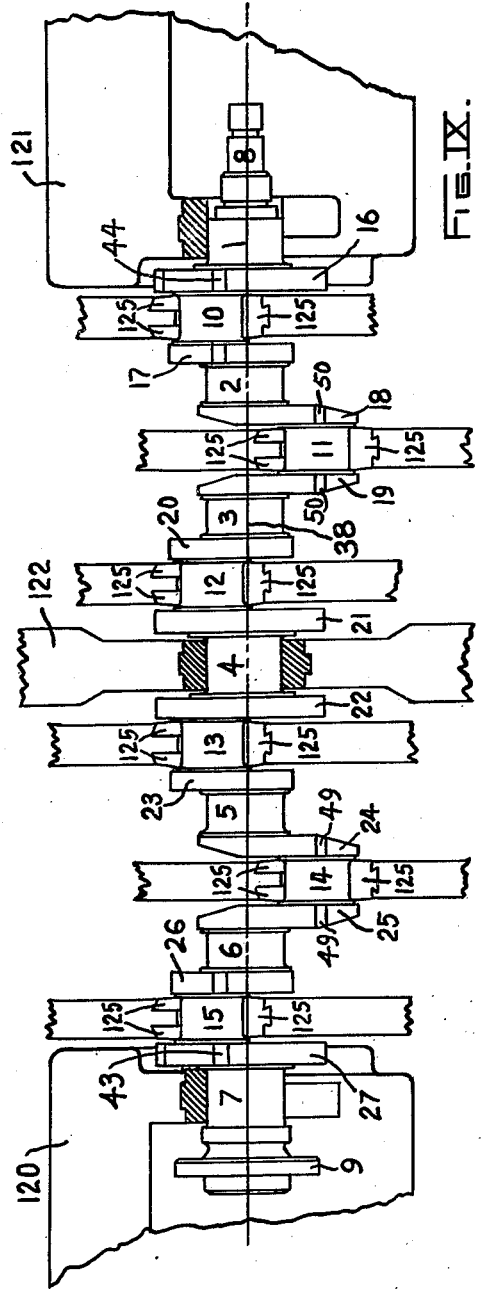

Patented June 9, 1942

2,285,772

UNITED STATES PATENT OFFICE 2,285,772

METHOD OF MACHINING CRANKSHAFTS

William F. Groene and Harold J. Siekmann, Cincinnati, Ohio, assignors to The R. K. Le Blond Machine Tool Company, Cincinnati, Ohio, a corporation of Ohio Application January 21, 1941, Serial No. 375,310

4 Claims. (Cl. 29—6)

This invention pertains to the machining of crankshafts for multi-cylinder internal combustion engines and is particularly related to machining the various line bearings, pin bearings, and associated portions of crankshafts. This invention is especially related to a method of procedure for machining specific types of crankshafts which present difficult problems of machining the various bearing portions in proper sequence in order to produce a shaft of the proper degree of accuracy and at a commensurate production rate necessary for their economical and practical commercial production. This particular invention is further specifically adapted to the machining of six-throw, seven-line bearing internal combustion engine crankshafts.

The machining of the line bearing and pin bearing portions of multi-throw crankshafts has always been a most difficult problem, especially when high production must be undertaken to produce such shafts in large quantities as, for example, is required for the automotive industry. The very shape and nature of the material of a crankshaft of this type leads to a multitude of difficulties when rapid machining operations are to be undertaken on the various bearing portions of the shaft.

There are three major aspects to this problem which involve inherent difficulties with the crankshaft itself. The first problem is that the shape of the crankshaft is such that the distribution of the metal is so displaced at various radially extended positions from a true cylindrical form of similar length that any machining undertaken on it results in torque stresses being set up in the crankshaft. This is particularly true in modern day machining operations on crankshafts wherein a large amount of metal is very rapidly removed from a plurality of bearing portions of the crankshafts at one time. This causes certain portions of the shaft to be rotated relative to other portions of the shaft so as to cause a displacement of the various portions relative to one another and to the true axis of rotation of the shaft.

A second inherent characteristic of a crankshaft which leads to extreme difficulty during machining is that when the metal is removed from the various bearing and associated portions of the crankshaft, stresses are relieved in said shaft which were originally set up during the forging or casting operation, so that when the work is again removed from the machine performing the turning operation, it is found that these shafts spring to a new position thus throwing the machined portions out of properly aligned position and resulting in inaccuracy of these machined portions.

And a third inherent characteristic of the crankshaft is the fact that it is extremely limber due to its shape. This is particularly so when it is supported at each of its ends. A force of even minor magnitude which is imparted to it by the cutting tools somewhere intermediate its ends easily deflects the shaft from true axial position, causing the machined portions to be formed on the shaft while it is in a deflected or sprung condition. Thus, at the completion of the machining operation, when the crankshaft springs back, the machined portions are found to be displaced from their correct positions.

The three chief difficulties to be met in turning a crankshaft are therefore (1) twisting caused by rotating the shaft against the cutting tools, (2) springing of the shaft to a new position caused by the removal of metal, and (3) deflection of the shaft during machining, usually arising from forces produced by the cutting tools during the cutting operation.

In addition to the above mentioned inherent difficulties of machining multi-throw internal combustion engine crankshafts, the specific problems, which are present in machining a six-throw, seven line bearing crankshaft, require special consideration and treatment to make possible the production of these types of shafts on a truly practical and commercial basis. It is with these latter problems that this invention is particularly related and has for its chief object a method providing a series of steps which have been carefully worked out both from the theoretical considerations of the problem of the nature of a crankshaft, as set forth above, and from practical experimental work to prove the most satisfactory way to approach the problem of machining all of the line bearings and associated portions and all of the pin bearings of a six-throw, seven-line bearing crankshaft.

In a crankshaft of this particular type, it is extremely difficult to provide adequate chucking means at the proper position lengthwise of the shaft because of the close arrangement of line bearings and pin bearings in which every pair of pins is separated by a line bearing. This presents the problem of locating and orienting the various cutting tools and driving fixtures in a position where adequate support for the working members of the machine tool in which said crankshafts are to be placed must be very carefully considered.

It is therefore the primary object of this invention to set forth a series of steps, which constitute the most efficient method of proceeding from the rough forging or casting forming a crankshaft of this type, to ultimately complete all of the machining operations on the various bearing portions of this type of crankshaft in a manner which provides rapid production and a product of a high degree of accuracy and finish after the completion of all of the steps to be performed on this work.

Further features and advantages and the details of the various steps necessary to carry out this method of machining these types of crankshafts will appear in the following description of the drawings in which:

Figure I is an illustration of a rough un-machined forging (or casting) of a six-throw, seven-line bearing crankshaft, showing the operation of applying the center holes in the ends of this rough forging.

Figure II shows the rough forging having the various locating areas machined on selected webs of the crankshaft while in a definite relationship to the center holes machined in the previous operation.

Figure III is a right hand stub end view of the crankshaft shown partially in section on the line III—III of Figure II.

Figure IV shows the forging prepared with the center holes and machined locating areas of Figure II chucked in a double center drive lathe by means of these centers and locating areas, wherein cutting tools are applied to simultaneously rough turn the flange and stub ends of said crankshaft and the line bearings 3 and 5 thereof.

Figure V shows the crankshaft, previously machined as in Figure IV, chucked in a double center drive lathe supported at its ends by the centers and supported in the center drive chucks by means of the machined line bearings 3 and 5 wherein cutting tools are applied to the crankshaft to rough form the numbers 1, 2, 4, 6, and 7 line bearings.

Figure Va is a fragmentary view of a portion of the crankshaft as it comes from the lathe of Figure V showing the application of a grinding wheel to rough grind the center line bearing 4.

Figure VI shows the crankshaft after the completion of the operation of Figure Va in a single center drive crankshaft lathe supported on centers and mounted in the center drive chuck by means of the center rough ground line bearing 4 wherein a series of cutting tools are applied to the crankshaft for the purpose of finish forming the flange and stub ends and the line bearings 1, 2, 3, 4, 6, and 7 of the shaft.

Figure VII shows the crankshaft chucked on its end line bearings 1 and 7 in pot chucks utilizing the locating areas on the terminal webs 20 and 27 and with its line bearing 4 supported in a steady rest of an orbital lathe, wherein all of the cheeks of the webs adjacent crank pins are simultaneously rough turned in a single operation.

Figure VIII again shows the crankshaft chucked in an orbital lathe as in Figure VII, wherein cutting tools are applied to form all of the crank pins of the crankshaft.

Figure IX is a view showing the crankshaft in an orbital lathe in which all of the crank pins are finish formed to accurate final sized dimensions.

The typical type of six-throw seven-line bearing crankshaft to be machined by this method is shown in the form of the rough forging in Figure I. This particular type of crankshaft comprises a series of line bearings 1 through 7, inclusive, and the stub end 8 and flange end 9 which are interconnected with the six crank pins 10 to 15, inclusive, by the webs 16 to 27 inclusive. In a crankshaft of this type, therefore, it is clearly apparent that between every pair of pin bearings is a line bearing so that in proceeding from one end to the other of the crankshaft, every other bearing is alternately a line bearing or a pin bearing, thus making a shaft having a maximum number of line bearings and pin bearings interconnected by webs in such a way that each of the line and pin bearings are relatively close to each other bringing about certain specific problems of bending and distortion in the shaft during the machining operation and also bringing about difficult problems of chucking and applying the cutting tools to the various bearing portions in the proper sequence to produce the necessary accurate work and high degree of finish for the completed crankshaft.

The accepted precedure for machining this particular type of crankshaft in the past has been as follows:

(a) Drill center holes in the ends of rough crankshaft forging.

(b) Mill locating areas on webs 18—19 and 24—25.

(c) Rough turn line bearings 3, 4, and 5 in double-end-drive pot-chuck lathe.

(d) Rough grind line bearings 3, 4, and 5.

(e) Rough turn flange end, stub end, and line bearings 1, 2, 6, and 7.

(f) Rough grind center line bearings 4.

(g) Rough grind stub end line bearings 1.

(h) Rough grind flange end line bearing 7.

(i) Shave line bearings 2, 3, 5, and 6.

(j) Mill locating areas on webs 16 and 27 for pin turning operation.

(k) Cheek all webs adjacent crank pins of crankshaft.

(l) Rough turn all crank pins of said crankshaft.

(m) Rough grind crank pins 1 and 6.

(n) Rough grind crank pins 2 and 5.

(o) Rough grind crank pins 3 and 4.

(p) Straighten crankshaft.

(q) Finish face flange end of crankshaft.

In the above laborious, tedious, and multitude of inefficient steps the crankshaft of Figure I has been machined in the past.

With our new method, however, this procedure is greatly simplified and has substantially half the number of steps necessary to complete the crankshaft and to finish the crankshaft to much greater accuracy and finer finish. This new process constitutes the following steps:

(a) Drill center holes in ends of rough crankshaft forging or casting Figure I.

(b) Mill locating areas on webs 16—17 and 26—27, for crank pin turning operations and the locating areas on webs 18—19 and 24—25, for line bearing turning operations.

(c) Rough turn stub end 1—8, line bearings 3 and 5 and the flange end 7—9, as shown in Figure IV.

(d) Rough turn line bearings 1, 2, 4, 6, and 7 simultaneously as shown in Figure V.

(e) Rough grind center line bearing 4, as shown in Figure Va.

(f) Finish turn line bearings 1, 2, 3, 5, 6, and 7, as shown in Figure VI.

(g) Cheek all faces of webs adjacent the crank pins 10—15 of the crankshaft as shown in Figure VII.

(h) Rough turn all of crank pins 10—15 of crankshaft as shown in Figure VIII.

(i) Finish turn all crank pins 10—15 simultaneously as shown in Figure IX.

A study and comparison of the above sets of tabulations of the former method and our new method, clearly show the great improvement in efficiency and reduction in number of operations required in our new method of procedure in machining the various bearing portions of this type of crankshaft.

Specifically considering the actual machining operations undertaken on this shaft, noting the crankshaft in Figure I, the rough forging is first prepared with center holes in its ends by suitable center drills 34 and 35 as done in the customary manner, usually after mass balancing or otherwise dynamically balancing the shaft to properly establish the axis of rotation 38 for the crankshaft.

The crankshaft is then supported as shown best in Figure II, on suitable centers in a machine of the type shown in Patent #2,118,260, dated May 24, 1938, wherein the crankshaft is properly supported by the centers 39 and 40, which establish the axis of rotation 38 for the shaft, and is so held that milling cutters 41 and 42 are arranged to pass across the respective webs, 21—26 and 16—17 to prepare appropriate locating surfaces 43 on them and locating surfaces 44 on the webs 17 and 16 respectively. Also, at the same time milling cutters 47 and 48 are applied to the webs 25—24 and 19—18 to respectively prepare the locating surfaces 49 and 50 on these webs.

Having thus prepared the center holes in the ends of the crankshaft and locating areas on the various webs of the crankshaft, the next step is then to chuck the crankshaft in a double center drive lathe, as shown in Figure IV, in which is provided a pair of center drive ring gears 53 and 54, having appropriate locating blocks 55 and 56 respectively with suitable clamping mechanism (not shown) for holding the locating notches 49 and 50 rigidly to the chucking devices for rotating and supporting the crankshaft utilizing a lathe of a type as shown in Patent #2,069,107 having chucks as shown in Patent #2,030,020. The ends of the crankshaft are supported by suitable centers 57 and 58 carried in appropriate tailstocks 59 and 60 respectively. Cutting tools 61, 62, and 63 are fed radially toward the axis of rotation of the crankshaft to machine the stub end 8, a cutting tool 64 cheeks the face of the web 16 adjacent the line bearing 1. Cutting tools 65, 66, 67, and 68 are also fed at the same time to the flange end 7 of the crankshaft to rough out the portion of it, while a cutting tool 69 cheeks the face of the web 27 adjacent the line bearing 7. Line bearings 3 and 5 have their diameters roughed out by the cutting tools 70 and 71 respectively, while suitable cheeking tools 72 and 73 cheek the faces of the respective webs 19—20 adjacent the line bearing 3 and webs 23—24 adjacent the line bearing 5. These machining operations on the crankshaft causes it to assume a new sprung position when unchucked so that the turned portions do not lie in accurate concentric position relative to the axis of rotation of the crankshaft as established by the centers.

Having thus completed this operation, the crankshaft is chucked again in another double center drive type of lathe as shown in Figure V, in which are provided the ring gears 75 and 76, which have appropriate work engaging bearings 77, and 78, respectively, which chuck around the machined line bearings 3 and 5 so as to hold the crankshaft with the bearing portions, previously turned in the step shown in Figure IV, again in proper position relative to the axis of rotation of the shaft as established by said center holes. These chucks may be of a character as shown in Patent #1,700,721. Again the ends of the crankshaft are supported by suitable centers 79 and 80 carried in the tailstocks 81 and 82 of this type of double center drive lathe. In this machine, the end of the stub end line bearing is faced by the cutting tool 83 and the line bearing rough turned by the cutting tools 84 and 85. The line bearings 2, 4, and 6, have their diameter portions rough turned by means of the respective tools 86, 87, 88, and 89, while the cheeks of the webs adjacent these line bearings are machined by the tools 92, 93, 94 and 95. The flange end line bearing 7 also has its diameter portion roughed out by the cutting tools 98 and 99. Thus, after the crankshaft has passed through the operation shown in Figure V all of the line bearing portions of the crankshaft of this type have then been completely roughed out ready for the finished turning operations on these bearing portions. Again, these machining operations further cause the crankshaft to assume a new sprung position when unchucked after this operation.

The next step is then to accurately prepare the center line bearing portion 4 by means of the rough grinding operation while the crankshaft is rotating on its center in this new sprung position shown in Figure Va, in which a grinding wheel 100 is appropriately fed to the diameter portion of this bearing 4 to accurately size it to suitable dimension and concentric with the axis of rotation established by said center holes for chucking in a single center drive crankshaft lathe in the next operation.

This next operation is shown in Figure VI and consists of chucking the crankshaft prepared in Figure Va in a single center drive lathe having the center drive ring gear chuck 101 with a suitable bearing receiving portion 102 which grips around the central rough ground line bearing 4 the ends of the crankshaft again being supported on suitable centers 103 and 104 in the tailstocks 105 and 106 of this machine. In this step, the cutting tools 107 are all fed simultaneously to all of the line bearing portions of the crankshaft to completely finish these portions to finish turn dimensions and with the crankshaft substantially free of all sprung condition caused by the two previous roughing operations.

Having thus completed the machining of the line bearing portions of the crankshaft, the crankshaft is then placed in an orbital lathe, Figure VII, of a type for example as shown in Patent #1,934,530 in which it is chucked in appropriate pot chucks 108 and 109 of a character shown in Patent #2,030,142 by means of its machined end line bearings 7 and 1 respectively so as to accurately hold the line bearings of the shaft on the proper axis of rotation of the shaft and is journaled in an appropriate steady rest 110 of a type, for example, as shown in Patent #2,085,357. A series of cheeking tools 113 are then applied to cheek the faces of the webs adjacent all of the crank pins 10 through 15, inclusive.

After the completion of this operation, the crankshaft again is chucked as shown in Figure VIII in an orbital lathe having suitable pot chuck devices 114 and 115 and supported in a steady rest 116 as in the previous operations in Figure VII. In this latter machine of Figure VIII a series of forming tools 119, are applied to rough turn all of the diameter portions of the crank pins 10 through 15 inclusive.

The final step in the machining of all of the bearing portions of the crankshafts is that shown in Figure IX in which the crankshaft is again chucked in a series of pot chuck devices 120 and 121 in an orbital lathe of a type shown for example in Patent Re. 18,662 and supported by a suitable steady rest 122. In this machine all of the bearing portions of the crank pins 10 through 15 and the associated fillets adjacent these bearings are machined by the finished crank pin turning tools 125, to thus complete the finish turning of all of the crank pin bearings of the crankshaft.

Having thus set forth the method of procedure constituting our invention as specifically applied to a six-throw seven-line bearing crankshaft, what we claim as new and desire to secure by United States Letters Patent is:

1. A method of machining the line bearings of a multi-throw crankshaft comprising the steps of: (a) drilling center holes in the ends of the rough crankshaft forging to establish the main axis of rotation for said crankshaft; (b) supporting said crankshaft by means of said center holes while milling locating areas on webs of said crankshaft in a predetermined accurately located position relative to said axis; (c) chucking and rotating said crankshaft by means of said locating areas and center holes and applying cutting tools to the crankshaft to machine the flange and stub ends and the two intermediate line bearings each side of the center line bearing of said crankshaft in a definite relation to its main axis of rotation as established by said centers; (d) chucking and rotating said crankshaft by means of said two machined intermediate line bearings and said center holes so as to hold said crankshaft on its proper axis of rotation against any sprung condition resulting from said previous machining operation and machining the remainder of the center line bearing, flange, and stub ends of said crankshaft; (e) supporting and rotating said crankshaft by said center holes while in its sprung position caused by said previous machining operations and grinding said center line bearing of said crankshaft to form a bearing surface in proper concentric relationship to the axis of rotation of said shaft on said centers in this sprung condition; and (f) chucking and rotating said crankshaft by means of said ground line bearing and center holes while applying cutting tools to remachine all of the remaining line bearing portions of said crankshaft simultaneously.

2. A method of machining the bearings of a multi-throw crankshaft comprising the steps of: (a) drilling center holes in the ends of the rough crankshaft forging to establish the main axis of rotation of said crankshaft; (b) supporting said crankshaft by means of said center holes while milling locating areas on webs of said crankshaft in a predetermined accurately located position relative to said axis; (c) chucking and rotating said crankshaft by means of said locating areas and center holes and applying cutting tools to the crankshaft to machine the flange and stub ends and the two intermediate line bearings each side of the center line bearing of said crankshaft in a definite relation to its main axis of rotation as established by said centers; (d) chucking and rotating said crankshaft by means of said two machined intermediate line bearings and said center holes so as to hold said crankshaft on its proper axis of rotation against any sprung condition resulting from said previous machining operation and machining the remainder of the center line bearing, flange, and stub ends of said crankshaft; (e) supporting and rotating said crankshaft by said center holes while in its sprung position caused by said previous machining operations and grinding said center line bearing of said crankshaft to form a bearing surface in proper concentric relationship to the axis of rotation of said shaft on said centers in this sprung condition; (f) chucking and rotating said crankshaft by means of said ground line bearing and center holes while applying cutting tools to remachine all of the remaining line bearing portions of said crankshaft simultaneously; (g) chucking and rotating said crankshaft by means of its line bearings and locating areas and applying cutting tools to the cheeks of the webs adjacent the crank pins of said crankshafts; (h) chucking and rotating said crankshaft by means of its line bearings and locating areas and applying cutting tools to the crank pin diameters of said crankshaft; and (i) chucking and rotating said crankshaft by means of its line bearings and locating areas and applying cutting tools to remachine the pin bearings of said crankshaft.

3. A method of machining the line bearings of a six throw seven line bearing crankshaft comprising the steps of; (a) drilling center holes in the ends of the rough crankshaft forging to establish the main axis of rotation for said crankshaft; (b) supporting said crankshaft by means of said center holes while milling locating areas on the webs adjacent the end crank pins for chucking said crankshaft in pin turning operations and machining locating areas on webs adjacent the next pair of crank pins proceeding from these end crank pins toward the center of the crankshaft, said locating areas being accurately located in predetermined position relative to said axis; (c) chucking and rotating said crankshaft by means of said second mentioned set of locating areas and said center holes and applying cutting tools to the crankshaft to machine the flange and stub ends and the line bearings 3 and 5 of said crankshaft in a definite relation to the main axis of rotation as established by said centers; (d) chucking and rotating said crankshaft by means of line bearings 3 and 5 and said center holes to hold said crankshaft on its proper axis of rotation against any sprung condition resulting from said previous machining operation and machining the remainder of the line bearings of said crankshaft (e) supporting and rotating said crankshaft by means of said center holes while in its sprung position caused by said previous machining operations and grinding the center line bearing of said crankshaft to form a bearing surface in proper concentric relationship to the axis of rotation of said shaft on said centers in said sprung condition; and (f) chucking and rotating said crankshaft by means of said ground center line bearing and center holes while applying cutting tools to remachine all of the remaining line bearing portions of said crankshaft simultaneously.

4. A method of machining the line bearings of a six-throw seven line bearing crankshaft comprising the steps of; (a) drilling center holes in the ends of the rough crankshaft forging to establish the main axis of rotation for said crankshaft; (b) supporting said crankshaft by means of said center holes while milling locating areas on the webs adjacent the end crank pins for chucking said crankshaft in pin turning operations and machining locating areas on webs adjacent the next pair of crank pins proceeding from these end crank pins toward the center of the crankshaft, said locating areas being accurately located in predetermined position relative to said axis; (c) chucking and rotating said crankshaft by means of said second mentioned set of locating areas and said center holes and applying cutting tools to the crankshaft to machine the flange and stub end and the line bearings 3 and 5 of said crankshaft in a definite relation to the main axis of rotation as established by said centers; (d) chucking and rotating said crankshaft by means of line bearings 3 and 5 and said center holes and to hold said crankshaft on its proper axis of rotation against any sprung condition resulting from said previous machining operation and machining the remainder of the line bearings of said crankshaft; (e) supporting and rotating said crankshaft by means of said center holes while in its sprung position caused by said previous machining operations and grinding the center line bearing of said crankshaft to form a bearing surface in proper concentric relationship to the axis of rotation of said shaft on said centers in said sprung condition; (f) chucking and rotating said crankshaft by means of said ground center line bearing and center holes while applying cutting tools to remachine all of the remaining line bearing portions of said crankshaft simultaneously; (g) chucking and rotating said crankshaft by means of its line bearings and said first mentioned locating areas and applying cutting tools to the cheeks of the webs adjacent to all of the crank pins of said crankshaft; (h) chucking and rotating said crankshaft by means of its line bearings and said first mentioned locating areas and applying cutting tools to all of the crank pin diameters of said crankshaft; and (i) chucking and rotating this crankshaft by means of its line bearings and said first mentioned locating areas and applying cutting tools to remachine all of the pin bearings of said crankshaft to final size dimension.

WILLIAM F. GROENE.
HAROLD J. SIEKMANN.